United States Patent
Moore, Jr. et al.

(10) Patent No.: US 8,825,189 B2
(45) Date of Patent: Sep. 2, 2014

(54) METHODS AND APPARATUS TO EXECUTE AN AUXILIARY RECIPE AND A BATCH RECIPE ASSOCIATED WITH A PROCESS CONTROL SYSTEM

(75) Inventors: James Henry Moore, Jr., Georgetown, TX (US); Nathan William Pettus, Georgetown, TX (US); William George Irwin, Austin, TX (US); Tusar Nanda, Austin, TX (US)

(73) Assignee: Fisher Rosemount Systems, Inc., Austin, TX (US)

( * ) Notice: Subject to any disclaimer, the term of this patent is extended or adjusted under 35 U.S.C. 154(b) by 735 days.

(21) Appl. No.: 11/939,281

(22) Filed: Nov. 13, 2007

(65) Prior Publication Data

US 2009/0125906 A1    May 14, 2009

(51) Int. Cl.
| | | |
|---|---|---|
| G06F 19/00 | (2011.01) | |
| G05B 13/02 | (2006.01) | |
| G05B 19/42 | (2006.01) | |
| G05B 19/418 | (2006.01) | |

(52) U.S. Cl.
CPC *G05B 19/41865* (2013.01); *G05B 2219/32096* (2013.01); *G05B 2219/32095* (2013.01); *G05B 2219/32077* (2013.01); *G05B 2219/32128* (2013.01)
USPC ............... 700/95; 700/29; 700/86; 700/97

(58) Field of Classification Search
USPC .......................................... 700/29, 86, 95, 97
See application file for complete search history.

(56) References Cited

U.S. PATENT DOCUMENTS

| | | |
|---|---|---|
| 4,500,687 A | 2/1985 | Wolfe |
| 4,570,217 A | 2/1986 | Allen et al. |
| 4,786,182 A | 11/1988 | Larsen |
| 4,885,677 A | 12/1989 | Heilman et al. |
| 5,058,043 A | 10/1991 | Skeirik |
| 5,113,350 A | 5/1992 | Sargent |
| 5,355,320 A | 10/1994 | Erjavic et al. |
| 5,499,188 A | 3/1996 | Kline, Jr. et al. |
| 5,576,946 A | 11/1996 | Bender et al. |
| 5,631,825 A | 5/1997 | van Weele et al. |
| 5,644,686 A | 7/1997 | Hekmatpour |

(Continued)

FOREIGN PATENT DOCUMENTS

| | | |
|---|---|---|
| DE | 10 2006 056143 A1 | 10/2007 |
| EP | 1 833 077 | 9/2007 |

(Continued)

OTHER PUBLICATIONS

Olsson (Batch Control and Diagnosis, Department of Automatic Control, Lund Institute of Technology, Jun. 2005).*

(Continued)

*Primary Examiner* — Darrin Dunn
(74) *Attorney, Agent, or Firm* — Hanley, Flight and Zimmerman, LLC

(57) ABSTRACT

Example methods and apparatus to execute an auxiliary recipe and a batch recipe execution are disclosed. A disclosed example method involves executing a first recipe, and before completion of execution of the first recipe, receiving an auxiliary recipe. The example method also involves determining whether the first recipe has reached an entry point at which the auxiliary recipe can be executed. The auxiliary recipe is then executed in response to determining that the first recipe has reached the entry point.

38 Claims, 7 Drawing Sheets

(56) References Cited

U.S. PATENT DOCUMENTS

| | | | |
|---|---|---|---|
| 5,689,415 A | 11/1997 | Calotychos et al. | |
| 5,696,885 A | 12/1997 | Hekmatpour | |
| 5,719,559 A | 2/1998 | Talbott et al. | |
| 5,720,007 A | 2/1998 | Hekmatpour | |
| 5,806,056 A | 9/1998 | Hekmatpour | |
| 5,822,745 A | 10/1998 | Hekmatpour | |
| 5,841,959 A | 11/1998 | Guiremand | |
| 5,870,768 A | 2/1999 | Hekmatpour | |
| 5,970,243 A | 10/1999 | Klein et al. | |
| 5,990,906 A | 11/1999 | Hudson et al. | |
| 6,000,830 A | 12/1999 | Asano et al. | |
| 6,173,418 B1 | 1/2001 | Fujino et al. | |
| 6,289,252 B1 | 9/2001 | Wilson et al. | |
| 6,292,708 B1 | 9/2001 | Allen et al. | |
| 6,296,711 B1 | 10/2001 | Loan et al. | |
| 6,385,496 B1 | 5/2002 | Irwin et al. | |
| 6,385,552 B1 | 5/2002 | Snyder | |
| 6,415,246 B1 | 7/2002 | Snyder | |
| 6,438,436 B1 | 8/2002 | Hohkibara et al. | |
| 6,488,037 B1 | 12/2002 | Guldi | |
| 6,507,765 B1 | 1/2003 | Hopkins et al. | |
| 6,522,934 B1 | 2/2003 | Irwin et al. | |
| 6,535,122 B1 | 3/2003 | Bristol | |
| 6,542,841 B1 | 4/2003 | Snyder | |
| 6,571,191 B1 | 5/2003 | York et al. | |
| 6,606,527 B2 | 8/2003 | de Andrade et al. | |
| 6,615,091 B1 | 9/2003 | Birchenough et al. | |
| 6,647,301 B1 | 11/2003 | Sederlund et al. | |
| 6,684,117 B2 | 1/2004 | Bacin et al. | |
| 6,690,274 B1 | 2/2004 | Bristol | |
| 6,697,690 B2 | 2/2004 | Scholl et al. | |
| 6,732,006 B2 | 5/2004 | Haanstra et al. | |
| 6,791,692 B2 | 9/2004 | Powell et al. | |
| 6,834,370 B1 | 12/2004 | Brandl et al. | |
| 6,853,920 B2 | 2/2005 | Hsiung et al. | |
| 6,871,299 B2 | 3/2005 | Havekost et al. | |
| 6,901,582 B1 | 5/2005 | Harrison | |
| 6,934,931 B2 | 8/2005 | Plumer et al. | |
| 6,947,917 B1 | 9/2005 | Mathur et al. | |
| 6,952,688 B1 | 10/2005 | Goldman et al. | |
| 6,952,808 B1 | 10/2005 | Jamieson et al. | |
| 6,976,033 B2 | 12/2005 | Yang et al. | |
| 6,983,229 B2 | 1/2006 | Brown | |
| 7,019,829 B2 | 3/2006 | Powell et al. | |
| 7,020,876 B1* | 3/2006 | Deitz et al. | 718/100 |
| 7,069,101 B1 | 6/2006 | Arackaparambil et al. | |
| 7,076,312 B2 | 7/2006 | Law et al. | |
| 7,092,771 B2 | 8/2006 | Retlich et al. | |
| 7,149,595 B2* | 12/2006 | D'Mura | 700/96 |
| 7,171,281 B2 | 1/2007 | Weber et al. | |
| 7,179,664 B2 | 2/2007 | Huang et al. | |
| 7,202,946 B2 | 4/2007 | Powell et al. | |
| 7,305,320 B2* | 12/2007 | Ahmed et al. | 702/155 |
| 7,310,798 B1 | 12/2007 | Gunara et al. | |
| 7,369,912 B2* | 5/2008 | Sherriff et al. | 700/100 |
| 7,630,777 B2* | 12/2009 | Rudnick et al. | 700/23 |
| 7,680,970 B2* | 3/2010 | Sherriff et al. | 710/240 |
| 7,738,973 B2 | 6/2010 | McGreevy et al. | |
| 7,738,983 B2* | 6/2010 | Yamaji et al. | 700/100 |
| 7,793,292 B2* | 9/2010 | Worek et al. | 718/101 |
| 7,926,024 B2* | 4/2011 | Clarke | 717/104 |
| 8,369,975 B2 | 2/2013 | Pettus et al. | |
| 2002/0048213 A1 | 4/2002 | Wilmer et al. | |
| 2002/0055804 A1 | 5/2002 | Betawar et al. | |
| 2002/0076689 A1 | 6/2002 | Farb et al. | |
| 2002/0182870 A1 | 12/2002 | Matsunaga et al. | |
| 2003/0090522 A1 | 5/2003 | Verhaar | |
| 2004/0128003 A1 | 7/2004 | Frampton et al. | |
| 2004/0181294 A1 | 9/2004 | Deitz et al. | |
| 2004/0225384 A1 | 11/2004 | Onishi et al. | |
| 2005/0015168 A1 | 1/2005 | Cho | |
| 2005/0052659 A1 | 3/2005 | Jacobsen et al. | |
| 2005/0177269 A1 | 8/2005 | Funk | |
| 2005/0228523 A1 | 10/2005 | Heminway et al. | |
| 2006/0020362 A1 | 1/2006 | Morinaga et al. | |
| 2006/0020931 A1* | 1/2006 | Clarke | 717/138 |
| 2006/0074608 A1* | 4/2006 | Clay et al. | 703/1 |
| 2006/0074736 A1* | 4/2006 | Shukla et al. | 705/8 |
| 2006/0089739 A1* | 4/2006 | Sherriff et al. | 700/99 |
| 2006/0129600 A1* | 6/2006 | Ode | 707/104.1 |
| 2006/0184264 A1* | 8/2006 | Willis et al. | 700/108 |
| 2006/0191993 A1 | 8/2006 | Markham et al. | |
| 2007/0005170 A1 | 1/2007 | Schedel | |
| 2007/0006123 A1* | 1/2007 | Matsui | 717/101 |
| 2007/0038889 A1 | 2/2007 | Wiggins et al. | |
| 2007/0050070 A1 | 3/2007 | Strain et al. | |
| 2007/0083282 A1 | 4/2007 | Lim | |
| 2007/0156272 A1* | 7/2007 | Winstead et al. | 700/97 |
| 2007/0179652 A1 | 8/2007 | Weigang et al. | |
| 2007/0212846 A1 | 9/2007 | Yokouchi et al. | |
| 2007/0233302 A1 | 10/2007 | Miyazaki et al. | |
| 2007/0235060 A1* | 10/2007 | Takizawa et al. | 134/1.2 |
| 2008/0127186 A1* | 5/2008 | Kanodia et al. | 718/101 |
| 2008/0147207 A1* | 6/2008 | D'Mura et al. | 700/20 |
| 2008/0172629 A1 | 7/2008 | Tien et al. | |
| 2009/0018692 A1* | 1/2009 | Yoneda | 700/121 |
| 2009/0082894 A1 | 3/2009 | Pettus et al. | |
| 2009/0125126 A1 | 5/2009 | Moore, Jr. et al. | |
| 2009/0164933 A1 | 6/2009 | Pederson et al. | |

FOREIGN PATENT DOCUMENTS

| | | | |
|---|---|---|---|
| EP | 2 088 491 A1 | 8/2009 | |
| GB | 2155662 | 9/1985 | |
| GB | 2352060 A | 1/2001 | |
| GB | 2364399 | 1/2002 | |
| GB | 2371610 | 7/2002 | |
| GB | 2 454 785 | 5/2009 | |
| JP | 08087421 | 4/1996 | |
| JP | 8161670 | 6/1996 | |
| JP | H0982589 | 3/1997 | |
| JP | H10105616 | 4/1998 | |
| JP | 2002312028 | 10/2002 | |
| JP | 200337032 | 2/2003 | |
| JP | 2003132093 | 5/2003 | |
| JP | 2003263221 | 9/2003 | |
| JP | 2005093922 | 4/2005 | |
| JP | 2005309486 | 11/2005 | |
| JP | 2006331272 | 12/2006 | |
| JP | 2007518145 | 7/2007 | |
| WO | 00/67086 | 11/2000 | |
| WO | 2005/058717 | 6/2005 | |
| WO | 2006/114595 | 11/2006 | |
| WO | 2007017738 | 2/2007 | |
| WO | 2007/086027 | 8/2007 | |
| WO | 2007/086458 | 8/2007 | |
| WO | WO 2007086458 A1 * | 8/2007 | |

OTHER PUBLICATIONS

Extended European Search Report corresponding to Application No. 08168831.9, dated Dec. 3, 2009, 8 pages.

UK Search Report corresponding to Application No. GB0820623.7, dated Feb. 18, 2009, 3 pages.

Steve Rubel, "Paying Attention to Attention," Mar. 28, 2006, [retrieved from http://www.micropersuasion.com/2006/03/paying_attention.html, accessed on Feb. 11, 2009], 2 pages.

"The Touchstone Manifesto," Touchstone—Are you Paying Attention, [retrieved from http://web.archive.org/web/20060615001506/www.touchstonegadget.com/manifesto/, accessed on Feb. 11, 2009], 2 pages.

Emerson Process Managment, "DeltaV Operate" Emerson Process Management Product Data Sheet, Dec. 2006, 9 pages.

Romero, Espuna, Friedler, Puigjaner. "A New Framework for Batch Process Optimization Using the Flexible Recipe." Industrial & Engineering Chemistry Research. vol. 42, pp. 370-379. 2003.

Deitz, Lorenzo, Stephan. "S88 Redefines Clean In Place." Jun. 2005. www.pharmamanufacturing.com.

Emerson Process Management. "DeltaV Batch Active Step Change." pp. 1-22. May 2004.

Santos. "Understanding S88 Batch Control." Nov. 2001. www.ABJOURNAL.com.

(56) References Cited

OTHER PUBLICATIONS

"Fisher-Rosemount System Expands the DeltaV System to 30,000 Points with Release 5;" Emerson Process Management-News; Jul. 10, 2000.

Stallman et al.; "Debugging with The GNU Source-Level Debugger"; Jan. 1994; Edition 4.12, pp. 1-15.

European Patent Office, "Examination Report," issued on Mar. 1, 2011, in European Patent Application No. 08168831.9 6 pages.

State Intellectual Property Office of P.R. China, "First Office Action," issued on Apr. 12, 2012, in Chinese Patent Application No. 200810176464.2, 11 pages.

European Patent Office, "Communication pursuant to Article 94(3) EPC," issued on Jun. 12, 2012, in European Patent Application No. 08 168 831.9-2206, 4 pages.

Intellectual Property Office, "Examination Report," issued on Feb. 10, 2012, in Great Britain Patent Application No. 0820623.7, 2 pages.

Japanese Patent Office, "Notice of Reasons for Rejection," issued in connection with Japanese Application No. 2008-290571, on Jan. 8, 2013, 3 pages.

Cybulski et al., "Fine Chemicals Manufacture: Technology and Engineering," 2001, 168 pages.

Japanese Patent Office, "Notice of Reasons for Rejection," issued in connection with Japanese Application No. 2013-079375, on Jan. 28, 2014 (2 pages).

European Patent Office, "Extended European Search Report," issued on May 23, 2013, in European Patent Application No. 13158161.3, 6 pages.

European Patent Office, "Exam Report," issued on Jul. 22, 2013, in European Patent Application No. 08168831.9, 3 pages.

\* cited by examiner

METHODS AND APPARATUS TO EXECUTE AN AUXILIARY RECIPE AND A BATCH RECIPE ASSOCIATED WITH A PROCESS CONTROL SYSTEM

FIELD OF THE DISCLOSURE

The present disclosure relates generally to process control systems and, more particularly, to methods and apparatus to execute an auxiliary recipe and a batch recipe associated with a process control system.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controllers receive signals indicative of process measurements made by the field devices and/or other information pertaining to the field devices, use this information to implement a control routine, and then generate control signals that are sent over the buses or other communication lines to the field devices to control the operation of the process. In this manner, the process controllers may execute and coordinate control strategies using the field devices via the busses and/or other communication links communicatively coupling the field devices.

Process control systems are often configured to perform processes in accordance with batch recipes to produce products. Product designers or engineers prepare recipes during a design time and store the recipes to be subsequently used a plurality of times by a process control system. A recipe typically includes a combination of unit procedures, operations, and phases, all of which include instructions to control process equipment (e.g., tanks, vats, mixers, boilers, evaporators, pumps, valves, etc.) to transfer, mix, etc. ingredients in a process control system to generate a product.

In a typical scenario, a process control system executes the recipe from start to finish to produce a desired product. However, in some cases, a need arises to depart from the normal process flow of a recipe due to, for example, an error in an ingredient, a need to refine a product, an external or environmental factor (e.g., temperature, humidity, etc.) that adversely affects certain operations, etc. Recipes are often intended to execute from start to finish without interruption or modification of the recipe. Thus, there are currently no easy methods by which a recipe can be modified once its execution has begun. If an error has occurred in a process during execution of a recipe for whatever reason or if modification of the recipe is desired after execution has begun, costly ingredients that have been partially processed may have to be scrapped to redesign the recipe during a design time followed by restarting the recipe. One traditional method of modifying a recipe during its execution requires an experienced operator or group of operators working together to manually shutdown certain process steps of the recipe, remove or circumvent unwanted process steps from the recipe, and insert desired process steps while ensuring that none of the modifications violate company standard process flow rules and/or industry standard process flow rules. Such a manual process is tedious, costly, time consuming, and prone to error because it requires significant expertise on the part of operator(s) to ensure that product quality is not adversely affected and/or that safe operating conditions are maintained.

SUMMARY

Example apparatus and methods to execute an auxiliary recipe and a batch recipe in a process control system are described. In accordance with one described example, a method involves executing a first recipe and before completion of the first recipe identifying an auxiliary recipe. The example method also involves determining whether the first recipe has reached an entry point at which the auxiliary recipe can be executed. The auxiliary recipe is then executed in response to determining that the first recipe has reached the entry point.

In accordance with another described example, an example apparatus includes a recipe interface to obtain an auxiliary recipe during execution of a batch recipe. The example apparatus also includes a process status identifier to determine whether the batch recipe has reached an entry point at which the auxiliary recipe can be executed. In addition, the example apparatus includes an operating mode selector to cause execution of the auxiliary recipe in response to determining that the batch recipe has reached the entry point.

In accordance with another described example, an example method involves receiving first and second recipes and identifying a transition point between at least two process steps in the first recipe. The example method also involves determining whether the second recipe can be executed at the transition point. A recipe entry point is then stored in association with the second recipe in response to determining that the second recipe can be executed at the transition point. The recipe entry point corresponds to the transition point.

In accordance with another described example, an example apparatus includes a recipe analyzer to receive first and second recipes and a phase transition identifier to identify a transition point between at least two process steps in the first recipe. The example apparatus also includes a rules compliance verifier to determine whether the second recipe can be executed at the transition point. In addition, the example apparatus includes an entry point generator to store a recipe entry point in association with the second recipe in response to determining that the second recipe can be executed at the transition point.

In accordance with another described example, an example apparatus includes a recipe interface to obtain an auxiliary recipe during execution of a batch recipe. The batch recipe is associated with a first recipe identifier and the auxiliary recipe is associated with a second recipe identifier equal to the first recipe identifier. In addition, the example apparatus includes a resource manager to identify equipment reserved for the batch recipe based on the first recipe identifier and to facilitate use of the equipment by the auxiliary recipe based on the second recipe identifier being equal to the first recipe identifier. The example apparatus also includes an operating mode selector to cause execution of the auxiliary recipe. The auxiliary recipe is to use the equipment reserved for the batch recipe based on the resource manager identifying the equipment based on the first and second recipe identifiers.

DETAILED DESCRIPTION

Figure 1:
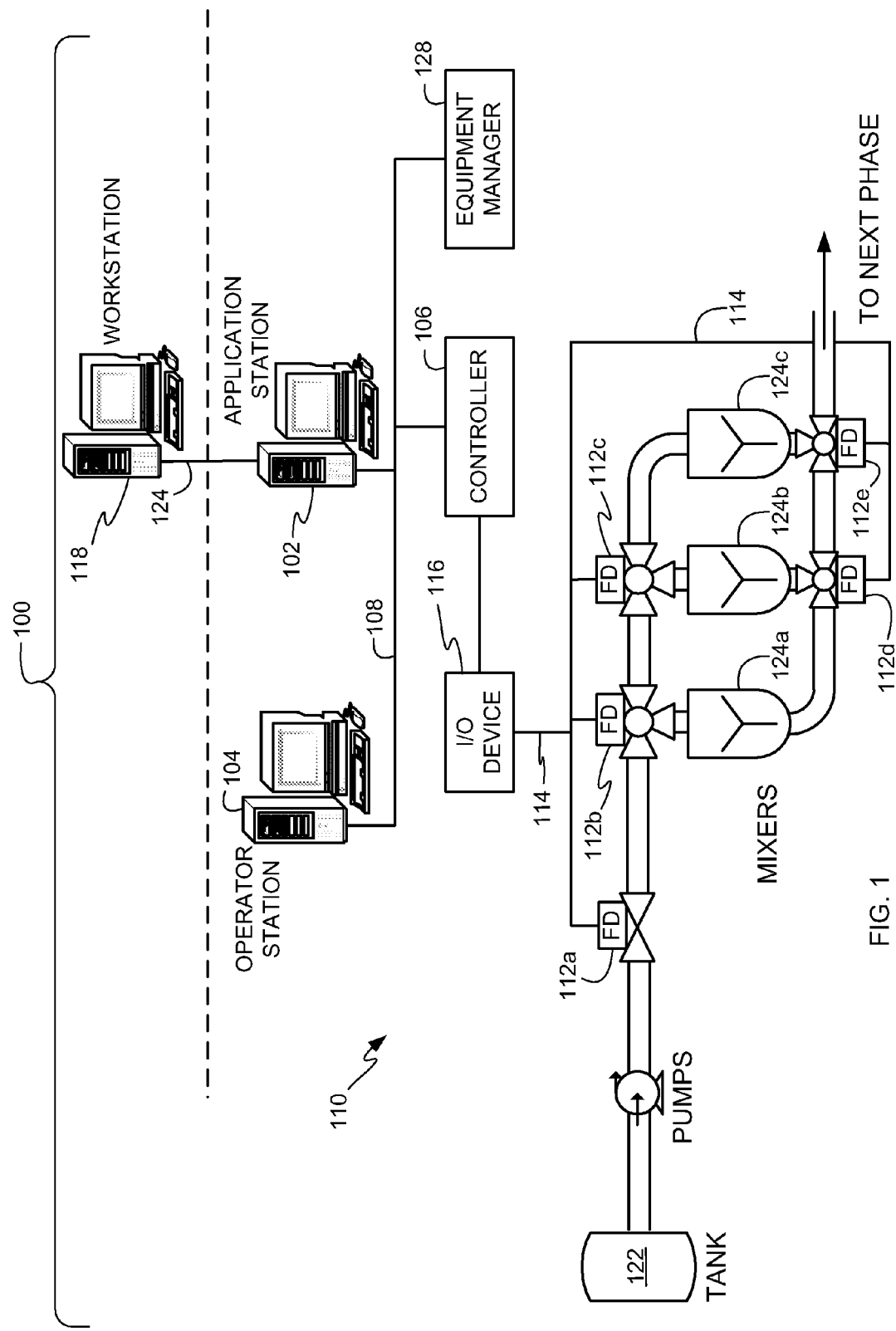
FIG. 1 is a block diagram illustrating an example enterprise in which the example methods and apparatus described herein may be implemented.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus.

The example methods and apparatus described herein can be used to execute an auxiliary recipe after a batch recipe has started executing in a process control system. While executing a recipe (e.g., a batch, a procedure, etc.) a problem or other situation may arise that an operator may wish to correct by executing another recipe (e.g., an auxiliary recipe) to perform operations that are not part of the currently active or running batch recipe. The identified problem or situation can be caused by factors external to the process control system such as, for example, delivery of the wrong ingredient, incorrect process settings, or merely by a desire to modify the composition of an end product. For example, while running a batch recipe, an operator may determine that a tank, vat, mixer, etc. must be cleaned to correct a problem in a mixture.

Traditional methods of executing auxiliary recipes while a batch recipe is being executed require an operator to run the batch recipe in a manual execution mode, halt certain operations or process steps, manually run the auxiliary recipe, end the auxiliary recipe after its completion, and set the batch recipe to run again in an automatic mode. During this entire process, the operator must recognize that halting process steps of the batch recipe and executing other process steps of the auxiliary recipe cannot violate any process flow rules. Process flow rules can be industry standards and/or manufacturer standards and are used to ensure safe operations and to promote high-quality process operations. An example standard that defines process flow rules is the S-88 ANSI/ISA-S88.01-1995 Batch Standard. However, other standards for process flow rules may additionally or alternatively be used in connection with the example methods and apparatus described herein.

Using traditional techniques to manually execute an auxiliary recipe when a batch recipe has already started is a very difficult and complex process because the equipment is already owned by or reserved for the executing batch recipe. To execute another recipe using traditional techniques requires releasing the equipment reserved by the currently executing recipe and re-acquiring the equipment by the subsequent recipe to be executed. Manually executing the auxiliary batch recipe requires a highly skilled person, is prone to errors, which could result in costly mistakes (e.g., needing to discard large amounts of wasted product) and loss of time (e.g., the time required to reconfigure a recipe and restart a process), and is often done at the risk of losing an entire product batch. In addition, manually executing an auxiliary recipe could also lead to lost time by the operator or operators trying repeatedly to correctly execute the auxiliary recipe.

Unlike the traditional methods used to execute auxiliary recipes after a batch recipe has already started execution that requires significant user interaction and expertise, the example methods and apparatus described herein enable users to execute auxiliary recipes during execution of batch recipes with significantly less user interaction. In particular, the example methods and apparatus described herein to execute auxiliary recipes involves defining one or more recipes during a design phase or configuration phase that can be run under (e.g., as part of, within the same context, within the same execution environment, etc.) a corresponding batch recipe. That is, during a design or configuration phase, a recipe designer ensures that each auxiliary recipe intended to be executed in connection with a particular batch recipe does not violate any process execution rules (e.g., S-88 batch standard rules) or conflict with the execution of the batch recipe in any way. During design of the auxiliary recipe, a process can be used to identify entry points of the batch recipe at which the batch recipe can be paused and the auxiliary recipe can be executed to avoid violating process flow rules and/or conflicting with the batch recipe execution. To execute an auxiliary recipe during execution of a batch recipe, the example methods and apparatus described herein involve monitoring the progress of the batch recipe to identify one or more predetermined entry points during the batch recipe process, pause execution of the batch recipe when it has reached one of the predetermined entry points, execute the auxiliary recipe, and continue execution of the batch recipe when the auxiliary recipe has completed its execution. In this manner, the example methods and apparatus described herein can substantially reduce or eliminate costly mistakes and loss of time by end users of process control systems.

The example methods and apparatus described herein enable users to predefine any number of different auxiliary recipes for which the users may foresee a need when running batch recipes. For example, a user may know that a product (e.g., paint) involving a particular process step sometimes requires a vat or mixer to be cleaned more than once when another batch recipe previously used that vat or mixer for a particular ingredient. Instead of preparing numerous different batch recipes intended for different situations in which operators may foresee having to perform specific uncommon operations or instead of performing the laborious and complex process of manually running an auxiliary recipe during execution for each customer, a user may instead use the same batch recipe regardless of whether the operator foresees having to run specific uncommon operations that are not part of the batch recipe and use one or more predefined auxiliary recipes if a situation is encountered during execution of the batch recipes requiring execution of the auxiliary recipe(s). In this manner, the example methods and apparatus described herein can automatically control execution of the batch recipe and the one or more auxiliary recipes in an orderly manner to prevent damage to the product being prepared.

In other example implementations, the example methods and apparatus described herein can be used to execute auxiliary recipes after a batch recipe has already started execution without requiring auxiliary recipe entry points to be predetermined or preconfigured for the batch recipe during a design phase. Instead, for instances in which a batch recipe has already started to execute and a user wishes to execute an auxiliary recipe that has not been analyzed during a design phase for execution in connection with the batch recipe, the example methods and apparatus described herein may be used to receive the auxiliary recipe specified by the user during the execution phase and execute the auxiliary recipe after the batch recipe has started to execute. The auxiliary recipe is configured to share equipment that is initially allocated to the batch recipe without requiring the batch recipe to release the equipment. In this manner, the batch recipe need not be ended to release equipment required by the auxiliary recipe. Instead, the batch recipe can be paused while retaining the allocated equipment, but allowing the auxiliary recipe to share (e.g., borrow) the equipment while the auxiliary recipe executes. Because the batch recipe did not release the equipment, when the auxiliary recipe finishes executing, the batch recipe can continue to execute without having to reacquire the equipment.

Now turning to FIG. 1, an example enterprise 100 in which the example methods and apparatus described herein may be implemented includes a process control system 110 having an application station 102, an operator station 104, and a controller 106, all of which may be communicatively coupled via a bus or local area network (LAN) 108. The LAN 108 is commonly referred to as an application control network (ACN) and may be implemented using any desired wired or wireless communication medium and protocol. Although one process control system is illustrated, the example enterprise 100 may include any number of distributed process control systems.

The application station 102 may be configured to perform operations associated with one or more software applications such as, for example, process control-related applications and communication applications that enable the application station 102, the operator station 104, and/or the controller 106 to communicate with other devices or systems. The application station 102 may also be configured to execute batch recipes to control the operations of the process control system 110 and/or any other process control system needed to execute the batch recipes. For example, the application station 102 can be provided with a batch recipe processor or application (not shown) that can acquire any necessary controllers (e.g., the controller 106) and/or any other resources (e.g., process equipment, field devices, instrumentation, etc.) to execute recipes. In addition, the application station 102 can perform operations associated with one or more application(s) used to implement the example methods and apparatus described herein to execute auxiliary recipes during execution of batch recipes. In some example implementations, the application station 102 and the operator station 104 may be configured to perform the same functions, while in other example implementations the operator station 104 may be primarily configured to display process status and allow minimal, restricted user interaction with the process. The application station 102 and the operator station 104 may be implemented using one or more workstations or any other suitable computer systems or processing systems (e.g., the processor system 710 of FIG. 7) including, for example, single processor personal computers, single or multi-processor workstations, etc.

The controller 106 may be coupled to a plurality of field devices 112 via a digital data bus 114 and an input/output (I/O) device 116. The field devices 112 may be Fieldbus compliant valves, actuators, sensors, etc. Of course, other types of field devices and communication protocols (e.g., Profibus devices and protocol, HART devices and protocol, etc.) could be used instead. Additional I/O devices (similar or identical to the I/O device 116) may be coupled to the controller 106 to enable additional groups of field devices, which may be Fieldbus devices, HART devices, etc., to communicate with the controller 106.

The controller 106 may be, for example, a DeltaV™ controller sold by Emerson Process Management. However, any other controller could be used instead. Further, while only one controller is shown in FIG. 1, additional controllers of any desired type or combination of types could be coupled to the LAN 108. In any case, the controller 106 may perform one or more process control routines that have been generated by a system engineer or other system operator using the application station 102, the operator station 104, or any workstation and which have been downloaded to and instantiated in the controller 106.

The enterprise 100 also includes a workstation 118 that is communicatively coupled to the application station 102 via another LAN 124 and to the operator station 104 and the controller 106 via the application station 102. The workstation 118 may be configured to perform enterprise-level or plant-wide functions. The workstation 118 may be associated with another process control system network (not shown) and configured to perform primarily process control functions, one or more communication functions, etc. In addition, the workstation 118 may be geographically remotely located, in which case the workstation may be communicatively coupled to the LAN 124 via a wide area network (WAN) that is implemented using, for example, a wireless communication link, an Internet-based or other switched packet-based communication network, telephone lines (e.g., digital subscriber lines), or any combination thereof.

In the illustrated example, each of the field devices 112 is coupled to process equipment to control the flow of fluid or material to be processed. In particular, each of the field devices 112 is coupled to a respective valve to control flow from a tank 122 to mixers 124a-c and from the mixers 124a-c to another process phase. The controller 106 is provided with a recipe or a portion of a recipe, which may be distributed among multiple controllers. A recipe can define a procedure to prepare a particular product (e.g., a paint, a fuel, a pharmaceutical, etc.) and includes, one or more unit procedures, which include one or more operations, each of which includes one or more phases (i.e., process steps). In the illustrated example of FIG. 1, a procedure can define multiple unit procedures to prepare a paint of a particular color. Each unit procedure can define a different mixing phase. For example, a first unit procedure can define a pre-mix procedure used to mix base ingredients (e.g., latex, oil, solvent, etc.), a second unit procedure may be used to mix intermediary ingredients (e.g., a binder, a surfactant, etc.), and another unit procedure may be used to mix colored pigments into the product.

Each unit procedure is implemented using one or more operations, each having one or more phases or process steps. A phase can correspond to particular process equipment (e.g., one of the mixers 124a-c). In the illustrated example of FIG. 1, executing an operation may involve using an ingredient addition phase corresponding to the tank 122 and a mixing or agitation phase corresponding to the mixer 124a. The addition phase may involve adding an ingredient from the tank 122 to another ingredient already in the mixer 124a and controlling the mixer 124a to mix the ingredients. After the mixer 124a is finished mixing the ingredients, the field devices 112d-e can be controlled to allow the mixed compound to flow from the mixer 124a to another phase, which may be part of the same or another operation.

To manage the process control equipment 112a-e, 122, and 124a-c for use by recipes, the process control system 110 is provided with an equipment manager 128. The equipment manager 128 is configured to acquire and reserve process control equipment (e.g., the process control equipment 112a-e, 122, and 124a-c of FIG. 1) needed by a recipe to implement a process defined by the recipe. When the recipe has completed execution, the equipment manager 128 is configured to release the process control equipment previously reserved for that recipe and acquire and reserve the equipment for any subsequently scheduled or queued recipe needing that equipment.

Traditionally, a batch recipe is designed at a design time and executed at runtime without an opportunity to modify the batch recipe or execute an auxiliary recipe in connection with the batch recipe in an automated fashion to add, modify, and/or eliminate phases, operations, and/or unit procedures. The example methods and apparatus described herein enable operators or other users to execute an auxiliary recipe after execution of the batch recipe has started running without having to prematurely end the batch recipe. For example, an original recipe may include a pre-mix operation to mix an ingredient from the tank 122 with another ingredient in the mixer 124a and then dump or transfer the resulting mixture to another phase. If, during operation, an operator or other user wishes to clean one of the mixers 124a-c to be used for mixing a subsequent ingredient, the operator or other user can use the methods and apparatus described herein to execute an auxiliary recipe designed to clean the mixer without having to end execution of the batch recipe or having to manually control the batch recipe execution.

The example methods and apparatus described herein enable auxiliary recipe execution to be substantially transparent to the user so that the user need not be aware of special operating conditions or use configurations (e.g., safety rules, quality control rules, etc.) that may prevent executing particular auxiliary recipes. Instead, the example methods and apparatus described herein enable a user to select a desired auxiliary recipe to be executed and select an auxiliary recipe execution button on a user interface display to run an auxiliary recipe execution routine that involves identifying an appropriate entry point or points of the executing batch recipe to ensure that the requested auxiliary recipe does not violate any process flow rules (e.g., the ANSI/ISA S88 Batch Standard rules) or conflict with the batch recipe.

The example enterprise 100 is provided to illustrate one type of system within which the example methods and apparatus described in greater detail below may be advantageously employed. However, the example methods and apparatus described herein may, if desired, be advantageously employed in other systems of greater or less complexity than the example enterprise 100 shown in FIG. 1 and/or systems that are used in connection with process control activities, enterprise management activities, communication activities, etc.

Figure 2:
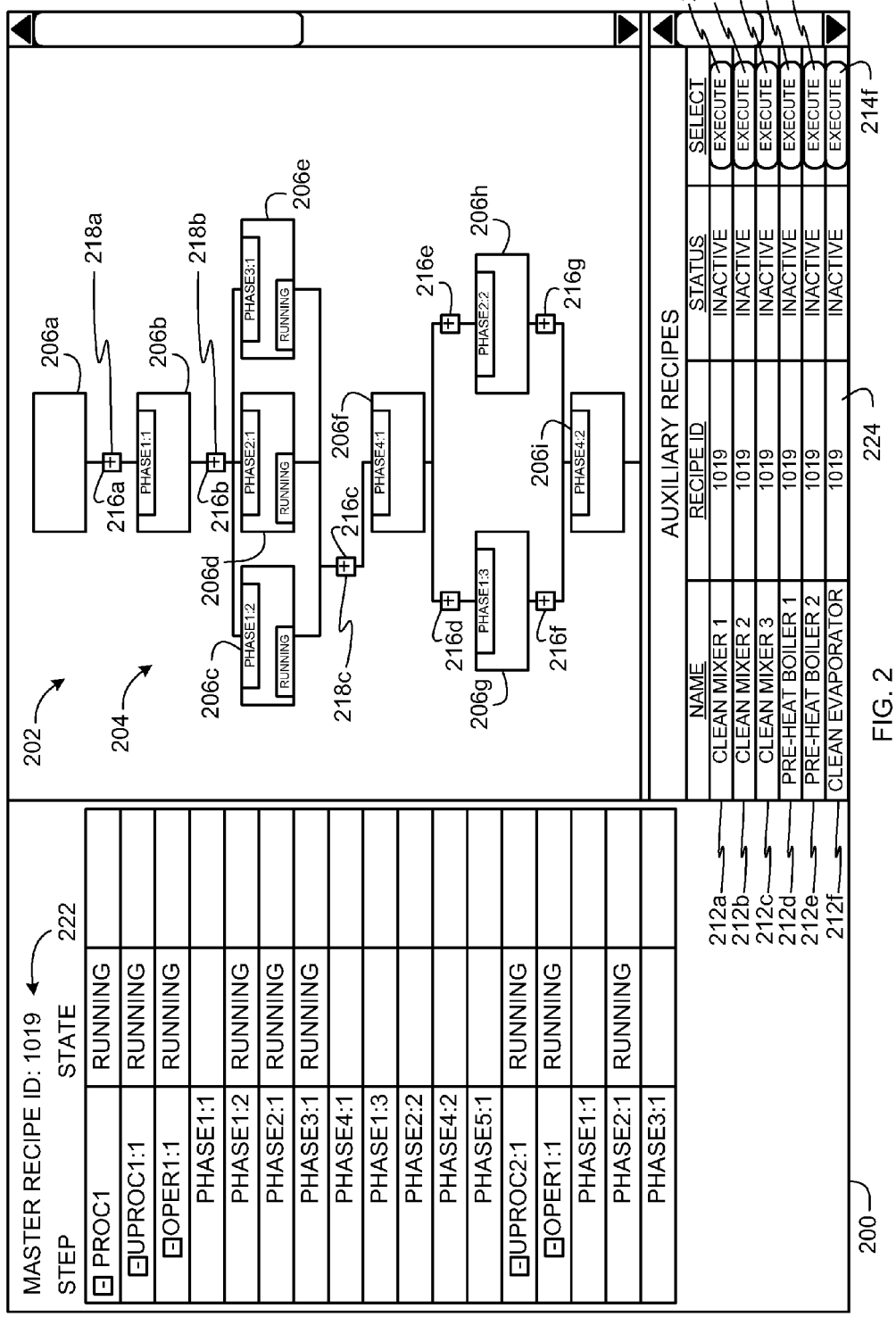
FIG. 2 is a graphical user interface (GUI) of an example procedural function chart (PFC) view interface and an auxiliary recipe view interface.

FIG. 2 is a graphical user interface (GUI) of an example procedural function chart (PFC) view interface 200. The example PFC view interface 200 can be displayed by one or more of the application station 102, the operator station 104, and/or the workstation 118 of FIG. 1. The example PFC view interface 200 includes a procedural function chart (PFC) 202 of an example batch recipe 204. The PFC 202 depicts a batch recipe having process steps or phases 206a-i to be executed in accordance with a pre-configured flow to implement a process. In the illustrated example, the predetermined flow of the batch recipe 204 involves executing the process step 206a followed by the process step 206b. After completion of the process step 206b, the process steps 206c-e execute in parallel, and process step 206f executes after completion of the process steps 206c-e. After completion of the process step 206f, the process steps 206g and 206h execute in parallel, and the process step 206i executes after completion of the process steps 206g and 206h. The recipe 204 in the illustrated example is implemented in accordance with process flow rules so that transitions between process steps do not violate any of the process flow rules (e.g., the ANSI/ISA S88 Batch Standard rules).

The example methods and apparatus described herein can be used to execute one or more of a plurality of auxiliary recipes 212a-f after the batch recipe 204 has started execution without having to prematurely end execution of the batch recipe 204. In the illustrated example of FIG. 2, each of the auxiliary recipes 212a-f is provided with a respective execute graphical button 214a-f, each of which can be selected by a user to execute a respective one of the auxiliary recipes 212a-f during execution of the batch recipe 204. For example, to execute one of the auxiliary recipes 212a-f, a user identifies which one of the auxiliary recipes 212a-f to execute and selects or clicks on a corresponding one of the execute buttons 214a-f. In this manner, a batch processor can identify an auxiliary recipe entry point at which the selected auxiliary recipe can be executed without violating any process flow rules and without conflicting with the batch recipe 204 in any other way.

In some example implementations, a user may specify during an execution phase an auxiliary recipe to be executed that is not shown in the auxiliary recipes listing of the example PFC view interface 200. For example, the example PFC view interface 200 may have an auxiliary recipe import or open menu command (not shown) that enables a user to select an auxiliary recipe from a data storage location.

In the illustrated example, the batch recipe 204 includes phase transition junctions 216a-g that define phase transition states or process step transition states between two or more of the process steps 206a-f. In the illustrated example, the three phase transition junctions 216a-c are designated as auxiliary recipe entry points 218a-c, which define points in the batch recipe 204 during which auxiliary recipes can be executed. Auxiliary recipe entry points can be different for each of the auxiliary recipes 212a-f. Whether a particular one of the auxiliary recipe entry points 218a-c is appropriate for a particular one of the auxiliary recipes 212a-f depends on whether executing that auxiliary recipe at that entry point would accomplish the purpose of that auxiliary recipe (e.g., clean a mixer for use with a subsequent ingredient) and whether executing the auxiliary recipe at that point would violate any process flow rules or conflict with execution of the batch recipe 204 in any other way. For example, the auxiliary recipe entry point 218a may be appropriate for the auxiliary recipe 212d to pre-heat boiler 1, but may not be appropriate for auxiliary recipe 212a to clean mixer 1.

In some example implementations, users may specify during an execution phase to execute auxiliary recipes for which auxiliary recipe entry points (e.g., the entry points 218a-c) were not predetermined or preconfigured during a design phase. In such example implementations, the example methods and apparatus described herein may be used to execute an auxiliary recipe specified by a user during an execution phase by executing the auxiliary recipe at the next available or next nearest phase transition point (e.g., one of the phase transition junctions 216a-g) or at a phase transition point specified by a user.

In the illustrated example, the batch recipe 204 is assigned a master recipe identifier 222 and each of the auxiliary recipes 212a-f is provided with a respective recipe identifier 224. The master recipe identifier 222 is used by an equipment manager (e.g., the equipment manager 128 of FIG. 1) of a process control system to acquire and reserve process control equipment (e.g., the process control equipment 112a-e, 122, and 124a-c of FIG. 1) needed by the batch recipe 204 to implement the process of the batch recipe 204. When process control equipment is acquired by the batch recipe 204, the equipment manager 128 uses the master recipe identifier 222 to designate the process control equipment as reserved by the batch recipe 204. To enable the auxiliary recipes 212a-f to execute under or in connection with the batch recipe 204 using the process control equipment acquired by the batch recipe 204, each of the auxiliary recipes 212a-f is assigned the same recipe identification as indicated by the master recipe identifier 222. In this manner, a batch processor will be able to use the process control equipment reserved by the equipment manager 128 for the batch recipe 204 to execute the auxiliary recipes 212a-f without having to release the equipment from the batch recipe 204 and reacquire the equipment by the auxiliary recipes 212a-f (or any other auxiliary recipe having the same recipe identification as the master recipe identifier 222). In many instances, it would be a very difficult and complex process to align the timing of releasing equipment by the batch recipe 204 and acquiring the equipment for the auxiliary recipes 212a-f because in a typical process control system many batch recipes are queued in a batch recipe schedule so that when equipment is released by a batch recipe it is immediately and automatically acquired by a subsequently queued or scheduled batch recipe without providing an opportunity for an operator to manually acquire the equipment to manually execute an auxiliary recipe.

Figure 3:
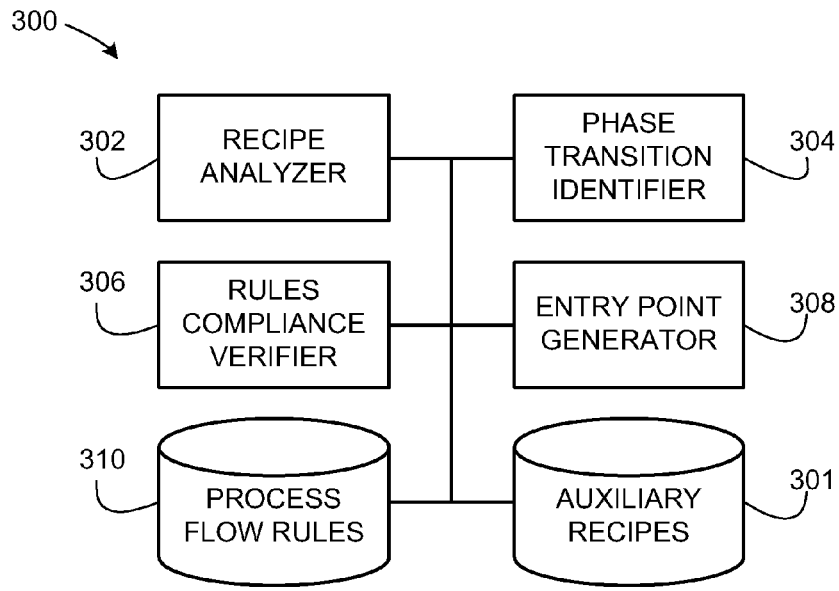
FIG. 3 is a block diagram of an example apparatus that may be used to determine auxiliary recipe entry points in a batch recipe during a design phase.
Figure 4:
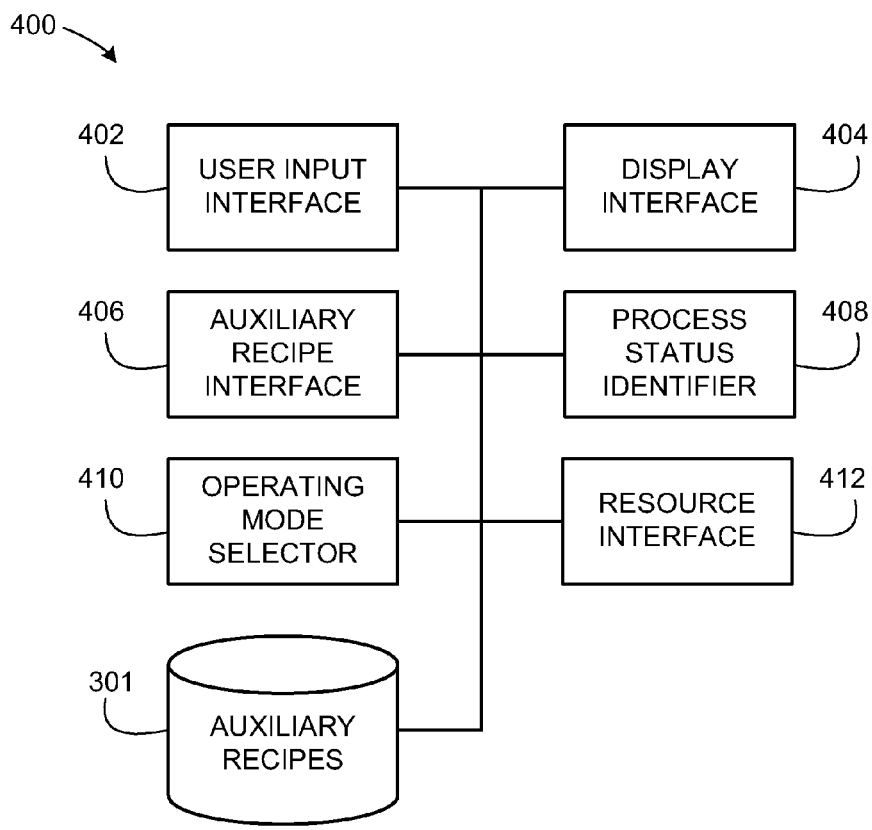
FIG. 4 is a block diagram of an example apparatus that may be used to execute auxiliary recipes after execution of a batch recipe has started.

FIG. 3 is a block diagram of an example apparatus 300 that may be used to determine auxiliary recipe entry points (e.g., the auxiliary recipe entry points 218a-c of FIG. 2) in a batch recipe (e.g., the batch recipe 204 of FIG. 2) during a design phase and FIG. 4 is a block diagram of an example apparatus 400 that may be used to execute auxiliary recipes (e.g., the auxiliary recipes 212a-f) after execution of a batch recipe has started. Each of the example apparatus 300 and 400 may be implemented using any desired combination of hardware, firmware, and/or software. For example, one or more integrated circuits, discrete semiconductor components, or passive electronic components may be used. Additionally or alternatively, some or all of the blocks of the example apparatus 300 and 400, or parts thereof, may be implemented using instructions, code, and/or other software and/or firmware, etc. stored on a machine accessible medium that, when executed by, for example, a processor system (e.g., the processor system 710 of FIG. 7) perform the operations represented in the flow diagrams of FIGS. 5 and 6. Although the example apparatus 300 and 400 are described as having one of each block described below, each of the example apparatus 300 and 400 may be provided with two or more of any block described below. In addition, some blocks may be disabled, omitted, or combined with other blocks.

Turning in detail to FIG. 3, the example apparatus 300 includes a recipe analyzer 302, a phase transition identifier 304, a rules compliance verifier 306, and an entry point generator 308, all of which may be communicatively coupled as shown or in any other suitable manner.

To obtain and analyze recipes, the example apparatus 300 is provided with the recipe analyzer 302. In the illustrated example, the recipe analyzer 302 receives batch recipes (e.g., the batch recipe 204 of FIG. 2) from, for example, batch processors (not shown) and retrieves auxiliary recipes (e.g., the auxiliary recipes 212a-f of FIG. 2) from an auxiliary recipes data structure 301 (e.g., a database). The recipe analyzer 302 is configured to analyze the auxiliary recipes to determine the equipment required by the recipes and the types of operations to be performed by the recipes. In this manner, the example apparatus 300 can determine the appropriate auxiliary recipe entry points (e.g., the auxiliary recipe entry points 218a-c of FIG. 2) for each auxiliary recipe in a corresponding batch recipe.

To identify phase transition junctions (e.g., the phase transition junctions 216a-g) between process steps of a batch recipe (e.g., the process steps 206a-i of the batch recipe 204 of FIG. 2), the example apparatus 300 is provided with a phase transition identifier 304. In particular, each phase transition junction between two or more process steps is a potential auxiliary recipe entry point that is analyzed by the rules compliance verifier 306 to determine that an auxiliary recipe to be executed will not violate any process flow rules or otherwise conflict with the batch recipe when the batch recipe is at a particular execution stage during that phase transition junction. For example, for each identified phase transition junction, the rules compliance verifier 306 can determine the operating state of each process step and the active equipment of the batch recipe and determine the process steps to be executed by the auxiliary recipe and the equipment required by the auxiliary recipe and ensure that executing the auxiliary recipe at the identified phase transition junction does not violate any process flow rules stored in a process flow rules data structure 310 or conflict in any other way with execution of the batch recipe.

To generate auxiliary recipe entry points for each auxiliary recipe, the example apparatus 300 is provided with an entry point generator 308. When the rules compliance verifier 306 determines that a particular phase transition junction identified by the phase transition identifier 304 is suitable for executing an auxiliary recipe, the entry point generator 308 stores that phase transition junction in association with its respective auxiliary recipe in the auxiliary recipes database 301 as an auxiliary recipe entry point (e.g., one of the auxiliary recipe entry points 218a-c of FIG. 2).

Turning now to FIG. 4, the example apparatus 400 includes a user input interface 402, a display interface 404, an auxiliary recipe interface 406, a process status identifier 408, an operating mode selector 410, and a resource interface 412, all of which may be communicatively coupled as shown or in any other suitable manner.

To receive inputs from a user, the example apparatus 400 is provided with the user input interface 402. The user input interface 402 may be implemented using a graphical user interface (GUI) and/or a mechanical interface (e.g., physical buttons). Referring to the illustrated example of FIG. 2, the user input interface 402 may be implemented using the PFC view interface 200 including the execute graphical buttons 214a-f. To display information to a user, the example apparatus 400 is provided with the display interface 404. The display interface 404 may be configured to display the PFC interface 200 and/or any other information related to executing auxiliary recipes.

In the illustrated example, the auxiliary recipe interface 406 is configured to retrieve auxiliary recipes stored in the auxiliary recipes database 301 and display the auxiliary recipes (e.g., the auxiliary recipes 212a-f of FIG. 2) via the display interface 404. The auxiliary recipe interface 406 can also retrieve configuration information, process flow information, entry point information, etc. for each auxiliary recipe specified by a user via the user input interface 402 to execute the user-specified auxiliary recipe.

To identify the status of processes used to implement a batch recipe (e.g., the batch recipe 204 of FIG. 2), the example apparatus 400 is provided with the process status identifier 408. For example, the process status identifier 408 may be used to determine which process steps or phases are being executed and whether process steps have completed execution. The process status information may be used to determine whether execution of a batch recipe is at an auxiliary recipe entry point (e.g., one of the auxiliary recipe entry points 218a-c of FIG. 2) that allows for the batch recipe to be paused to execute an auxiliary recipe (e.g., one of the auxiliary recipes 212a-f) and/or whether a wait period is required to permit the batch recipe to reach an auxiliary recipe entry point. In the illustrated example, the process status identifier 406 is configured to retrieve auxiliary recipe entry points from the auxiliary recipes database 301. Additionally or alternatively, the process status identifier 406 can be configured to determine whether execution of a batch recipe has reached a next available phase transition point (e.g., one of the phase transition junctions 216a-g of FIG. 2) or a user-specified phase transition point at which a user-specified that an auxiliary recipe is to be executed when auxiliary recipe entry points have not been predetermined or preconfigured during a design phase for the user-specified auxiliary recipe.

To change the operating modes of a batch processor, the example apparatus 400 is provided with the operating mode selector 408. For example, the operating mode selector 408 can be used to change the operating mode of a recipe from a normal execution mode to a pause or halt mode, thereby preventing execution of any subsequent process steps of a recipe. Such a change in operating modes can be used to allow execution of an auxiliary recipe so that the auxiliary recipe does not interfere with operations of the batch recipe.

To obtain process equipment (e.g., one or more of the tank 122, the mixers 124a-c, the field devices 112a-e, etc.) for use in executing the auxiliary recipes 212a-f (FIG. 2), the example apparatus 400 is provided with the resource interface 412. In the illustrated example, the resource interface 412 is used to determine which equipment has been reserved by the equipment manger 128 (FIG. 1) for use by the batch recipe 204. Because the auxiliary recipes 212a-f are assigned the same recipe identifier 224 (FIG. 2) as the master recipe identifier 222 (FIG. 2) of the batch recipe 204, the auxiliary recipes 212a-f are able to use the same equipment reserved for the batch recipe 204.

Figure 5:
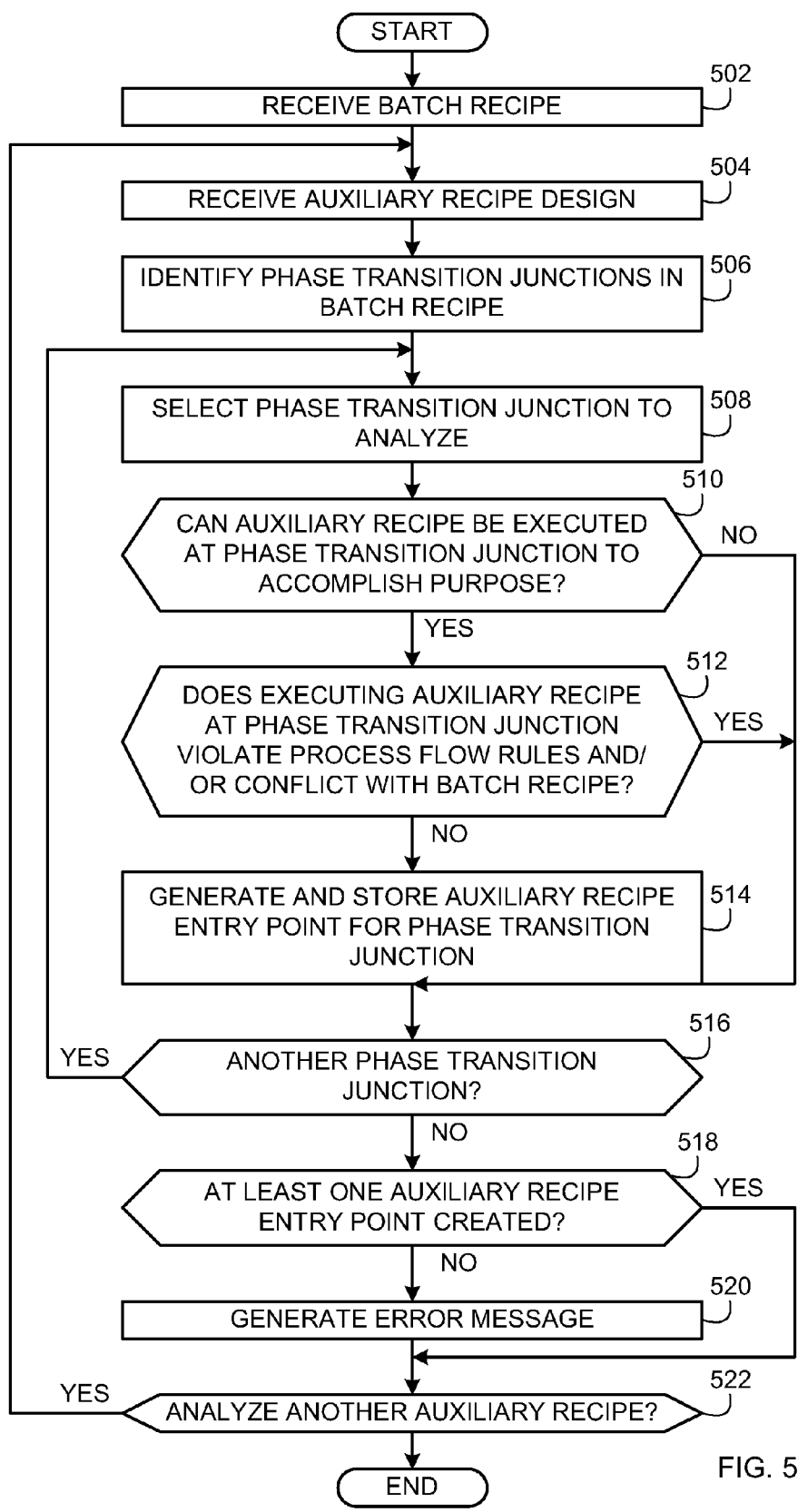
FIG. 5 depicts a flow diagram of an example method that may be used to implement the example apparatus of FIG. 3 to determine auxiliary recipe entry points in a batch recipe during a design phase.
Figure 6A:
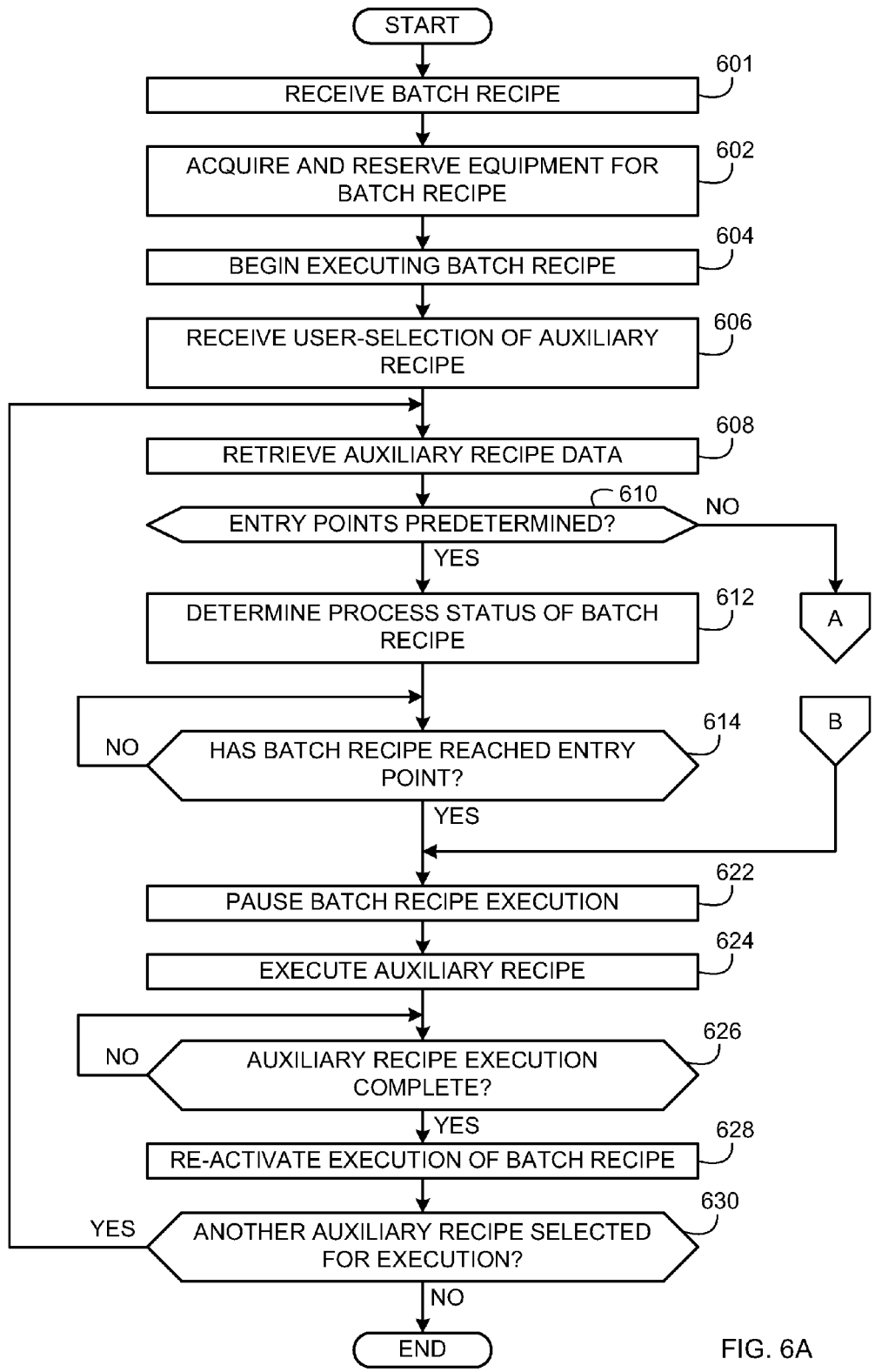
FIGS. 6A and 6B depict a flow diagram of an example method that may be used to implement the example apparatus of FIG. 4 to execute auxiliary recipes after execution of a batch recipe has started.
Figure 6B:
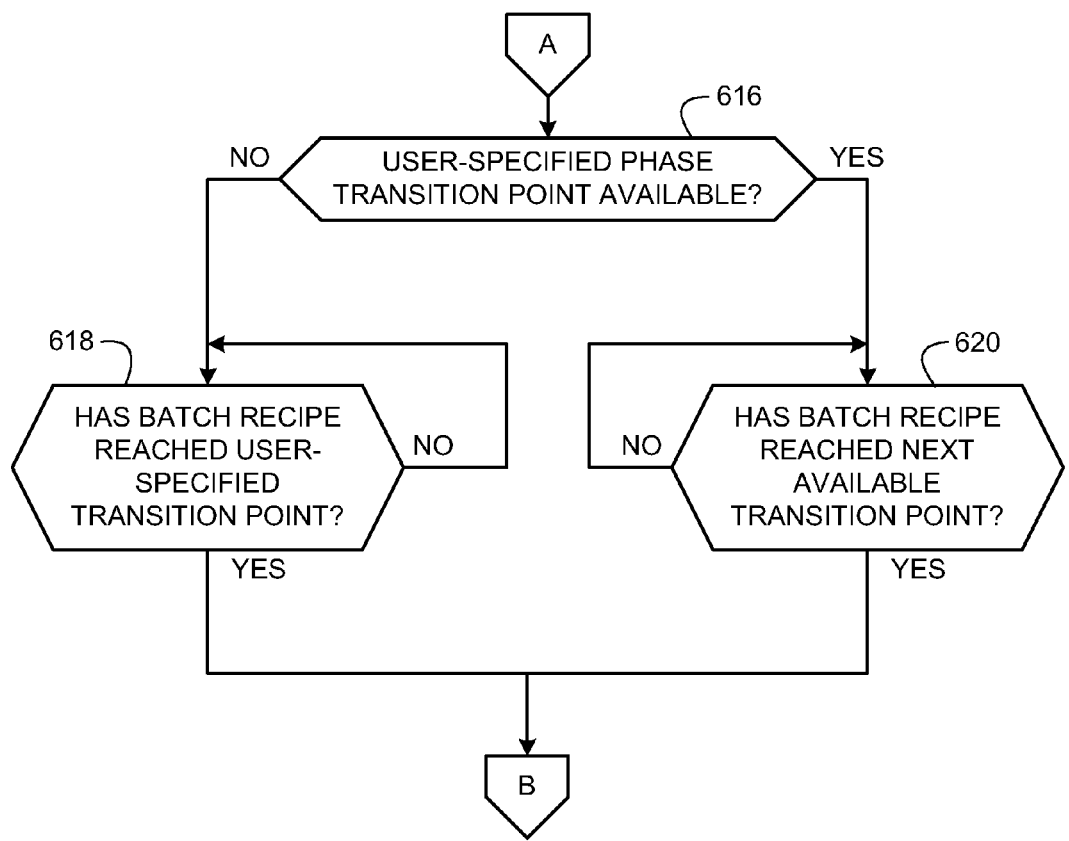

FIG. 5 depicts a flow diagram of an example method that may be used to implement the example apparatus 300 of FIG. 3 to determine auxiliary recipe entry points (e.g., the auxiliary recipe entry points 218a-c of FIG. 2) in a batch recipe (e.g., the batch recipe 204 of FIG. 2) during a design phase. FIGS. 6A and 6B depict a flow diagram of an example method that may be used to implement the example apparatus 400 of FIG. 4 to execute auxiliary recipes (e.g., the auxiliary recipes 212a-f of FIG. 2) after execution of a batch recipe (e.g., the batch recipe 204) has started. In some example implementations, each of the example methods of FIGS. 5, 6A, and 6B may be implemented using machine readable instructions comprising a program for execution by a processor (e.g., the processor 712 shown in the example processor system 710 of FIG. 7). The programs may be embodied in software stored on a tangible medium such as a CD-ROM, a floppy disk, a hard drive, a digital versatile disk (DVD), or a memory associated with the processor 712 and/or embodied in firmware and/or dedicated hardware in a well-known manner. Further, although the example programs are described with reference to the flow diagrams illustrated in FIGS. 5, 6A, and 6B, persons of ordinary skill in the art will readily appreciate that many other methods of implementing the example apparatus 300 and 400 may alternatively be used. For example, the order of execution of the blocks may be changed, and/or some of the blocks described may be changed, eliminated, or combined.

Turning in detail to the example method of FIG. 5, initially, the recipe analyzer 302 (FIG. 3) receives a batch recipe (block 502) (e.g., the batch recipe 204 of FIG. 2) from, for example, a batch processor (not shown). In addition, the recipe analyzer 302 receives an auxiliary recipe design (block 504) (e.g., one of the auxiliary recipes 212a-f of FIG. 2) from, for example, the auxiliary recipes database 301. The phase transition identifier 304 (FIG. 3) identifies or finds phase transition junctions (e.g., the phase transition junctions 216a-g) in the batch recipe 204 (block 506).

The example apparatus 300 selects one of the phase transition junctions 216a-g to analyze (block 508), and the recipe analyzer 302 determines whether the auxiliary recipe obtained at block 504 can be executed at the selected phase transition junction to accomplish its purpose (block 510). For example, if the purpose of the auxiliary recipe is to clean a mixer for use with a particular target ingredient and the process step following the phase transition junction is configured to deliver the target ingredient to the mixer, then the recipe analyzer 302 may determine that the auxiliary recipe can be executed at the phase transition junction to accomplish its purpose. On the other hand, if the subsequent process step is to use the mixer for a different ingredient than that for which the cleaning is intended and, thus, will make the mixer unclean again before delivering the target ingredient to the mixer, then the recipe analyzer 302 may determine that the auxiliary recipe cannot be executed at the selected phase transition junction to accomplish its purpose because the mixer will become unclean again before using it with the target ingredient.

If the recipe analyzer 302 determines that the auxiliary recipe can be executed at the phase transition junction to accomplish its purpose (block 510), the rules compliance verifier 306 (FIG. 3) determines whether executing the auxiliary recipe at the phase transition junction violates any process flow rules and/or conflicts with the batch recipe 204 (block 512). For example, the rules compliance verifier 306 can determine whether executing the auxiliary recipe at the phase transition junction based on rules stored in the process flow rules database 310 (FIG. 3). Also, the rules compliance verifier 306 may determine whether executing the auxiliary recipe at the phase transition junction will conflict with the batch recipe 204 based on an analysis of the batch recipe 204 performed by the recipe analyzer 302.

If the rules compliance verifier 306 determines that executing the auxiliary recipe at the phase transition junction will not violate any process flow rules and will not conflict with the batch recipe 204 (block 512), the entry point generator 308 (FIG. 3) generates an auxiliary recipe entry point (e.g., one of the auxiliary recipe entry points 218a-c of FIG. 2) corresponding to the analyzed phase transition junction and stores the auxiliary recipe entry point in the auxiliary recipes database 301 in association with the auxiliary recipe received at block 504 (block 514).

After the entry point generator 308 generates and stores an auxiliary entry point (block 514) or if the rules compliance verifier 306 determines that executing the auxiliary recipe at the phase transition junction will violate a process flow rule and/or will conflict with the batch recipe 204 (block 512) or if the recipe analyzer 302 determines that the auxiliary recipe cannot be executed at the phase transition junction to accomplish its purpose (block 510), the phase transition identifier 304 determines whether the batch recipe 204 has any more phase transition junctions to analyze (block 516). If there is another phase transition junction to analyze (block 516), control returns to block 508 so that the phase transition identifier 304 can select another phase transition junction to be analyzed. Otherwise, if no more phase transition junctions remain to be analyzed (block 516), the recipe analyzer 302 determines whether at least one auxiliary recipe entry point was created for the analyzed auxiliary recipe (block 518). If no auxiliary recipe entry points were created (block 518), the recipe analyzer 302 generates an error message (block 520). The recipe analyzer 302 may store the error message in a log file and/or the error message may be displayed to a user.

After generating the error message (block 520) or if the recipe analyzer 302 determines that at least one auxiliary recipe entry point was created (block 518), the example apparatus 300 determines whether to analyze another auxiliary recipe (block 522). For example, if another auxiliary recipe stored in the auxiliary recipe database 301 remains to be analyzed, the recipe analyzer 302 determines that it should analyze another auxiliary recipe and control returns to block 504. Otherwise, the example process of FIG. 5 is ended.

The example method of FIGS. 6A and 6B can be used to execute one of the auxiliary recipes 212a-f of FIG. 2 (or any other auxiliary recipe specified by a user) after execution of the batch recipe 204 has started. Initially, a batch recipe processor (not shown) receives a batch recipe (e.g., the batch recipe 204 of FIG. 2) (block 601), and the equipment manager 128 (FIG. 1) acquires and reserves process control equipment (e.g., one or more of the tank 122, the mixers 124a-c, the field devices 112a-e, etc.) needed to execute the batch recipe 204 (block 602). For example, the equipment manager 128 may reserve the acquired process control equipment for the batch recipe 204 by storing the master recipe identifier 222 (FIG. 2) of the batch recipe 204 in association with equipment identifiers of the acquired equipment in, for example, an equipment management database or arbitration database (not shown) of the equipment manager 128. The batch recipe processor then executes the batch recipe 204 (block 604).

The example apparatus 400 receives a user-selection indicative of an auxiliary recipe (e.g., one of the auxiliary recipes 212a-f or any other auxiliary recipe) (block 606) via the user input interface 402 (FIG. 4). For purposes of discussion, the following is described with respect to the auxiliary recipe 212a. The auxiliary recipe interface 406 (FIG. 4) then retrieves the auxiliary recipe data of the auxiliary recipe 212a (block 608) from, for example, the auxiliary recipes database 301. For example, the auxiliary recipe interface 406 may retrieve the process steps and process flow configuration of the auxiliary recipe 212a, descriptions of the required equipment (e.g., one or more of the tank 122, the mixers 124a-c, the field devices 112a-e, etc.), and one or more auxiliary recipe entry points (e.g., the auxiliary entry points 218a-c) of the auxiliary recipe 212a if any one or more auxiliary recipe entry points were predetermined or preconfigured for the auxiliary recipe 212a during a design phase.

The auxiliary recipe interface 406 then determines whether one or more auxiliary recipe entry points were predetermined for the auxiliary recipe 212a (block 610). For example, if one or more entry points were determined during a design phase for the auxiliary recipe 212a, then the one or more entry points will be available during the execution phase to execute the auxiliary recipe 212a. However, if no entry points were determined during the design phase for the auxiliary recipe 212a, then no entry points will be available during the execution phase and the auxiliary recipe 212a will be executed at a next nearest phase transition junction (e.g., one of the transition junctions 216a-g of FIG. 2) or a phase transition junction specified by a user without using predetermined or preconfigured auxiliary recipe entry points.

If the auxiliary recipe interface 406 determines that one or more auxiliary recipe entry points were predetermined and are available for the auxiliary recipe 212a (block 610), the process status identifier 408 (FIG. 4) determines a process status of the execution of the batch recipe 204 (block 612). For example, the process status identifier 408 may determine the process status of the batch recipe 204 to determine the next nearest auxiliary entry point (e.g., one of the auxiliary recipe entry points 218a-c of FIG. 2) available for the auxiliary recipe 212a to be executed. The process status identifier 408 then determines whether the execution of the batch recipe 204 has reached an auxiliary recipe entry point retrieved at block 608 (block 614). If the batch recipe 204 has not reached an auxiliary recipe entry point, control remains at block 614 until an auxiliary recipe entry point is reached.

Returning to block 610, if the auxiliary recipe interface 406 determines at block 610 that auxiliary recipe entry points were not predetermined (or are otherwise not available) for the auxiliary recipe 212a retrieved at block 608, control proceeds to block 616 (FIG. 6B). Because no auxiliary recipe entry points are available, the auxiliary recipe interface 406 determines whether a user-specified phase transition point is available (block 616). For example, when a user specifies a particular auxiliary recipe to be executed, but no auxiliary recipe entry points were predetermined for the specified auxiliary recipe during a design phase, the user may specify during the execution phase a particular phase transition point (e.g., one of the phase transition junctions 216a-g of FIG. 2) at which the specified auxiliary recipe should be executed. Otherwise, if the user does not specify a particular phase transition point at which to execute the user-specified auxiliary recipe, the auxiliary recipe is executed at the next available phase transition point.

If the auxiliary recipe interface 406 determines that the user specified a phase transition point (block 616), the process status identifier 408 determines whether the execution of the batch recipe 204 has reached the user-specified phase transition point (block 618). If the batch recipe 204 has not reached the user-specified phase transition point, control remains at block 618 until the phase transition point is reached.

On the other hand, if the auxiliary recipe interface 406 determines that the user did not specify a phase transition point (block 616), the process status identifier 408 determines whether the execution of the batch recipe 204 has reached a next available or next nearest phase transition point (block 620) at which to execute the auxiliary recipe 212a. If the batch recipe 204 has not reached a next available phase transition point (e.g., a currently executing phase or process step has not finished executing), control remains at block 620 until the next available phase transition point is reached.

Returning to FIG. 6A, when the batch recipe 204 reaches a next available transition point (block 620) (FIG. 6B) or when the batch recipe 204 reaches a user-specified transition point (block 618) or when the batch recipe 204 reaches an auxiliary recipe entry point (block 614), the operating mode selector 410 pauses or halts execution of the batch recipe 204 (block 622) (FIG. 6A) and causes the auxiliary recipe 212a to be executed (block 624). In the illustrated example, to ensure that the auxiliary recipe 212a can use the process control equipment (e.g., one or more of the tank 122, the mixers 124a-c, the field devices 112a-e, etc.) already reserved by the equipment manager 128 (FIG. 1) for the batch recipe 204, the auxiliary recipe 212a is assigned a recipe identifier (e.g., the recipe identifier 224 of FIG. 2) that matches a master recipe identifier (e.g., the master recipe identifier 222) of the batch recipe 204. In this manner, the resource interface 412 (FIG. 4) can ensure that any equipment reserved for the batch recipe 204 under the master recipe identifier 222 can be used by the auxiliary recipe 212a without needing the equipment to be released by the batch recipe 204 and re-acquired and reserved for the auxiliary recipe 212a.

The process status identifier 408 then determines whether the auxiliary recipe 212a has completed execution (block 626). If the auxiliary recipe 212a has not completed execution (block 626), the process status identifier 408 continues to monitor execution of the auxiliary recipe 212a at block 626 until the auxiliary recipe 212a completes execution. When the auxiliary recipe 212a completes execution, the operating mode selector 410 re-activates execution of the batch recipe 204 (block 628).

The auxiliary recipe interface 406 then determines whether another auxiliary recipe has been selected for execution (block 630). If another auxiliary recipe has been selected for execution, control returns to block 608. Otherwise, the example process of FIGS. 6A and 6B is ended.

Figure 7:
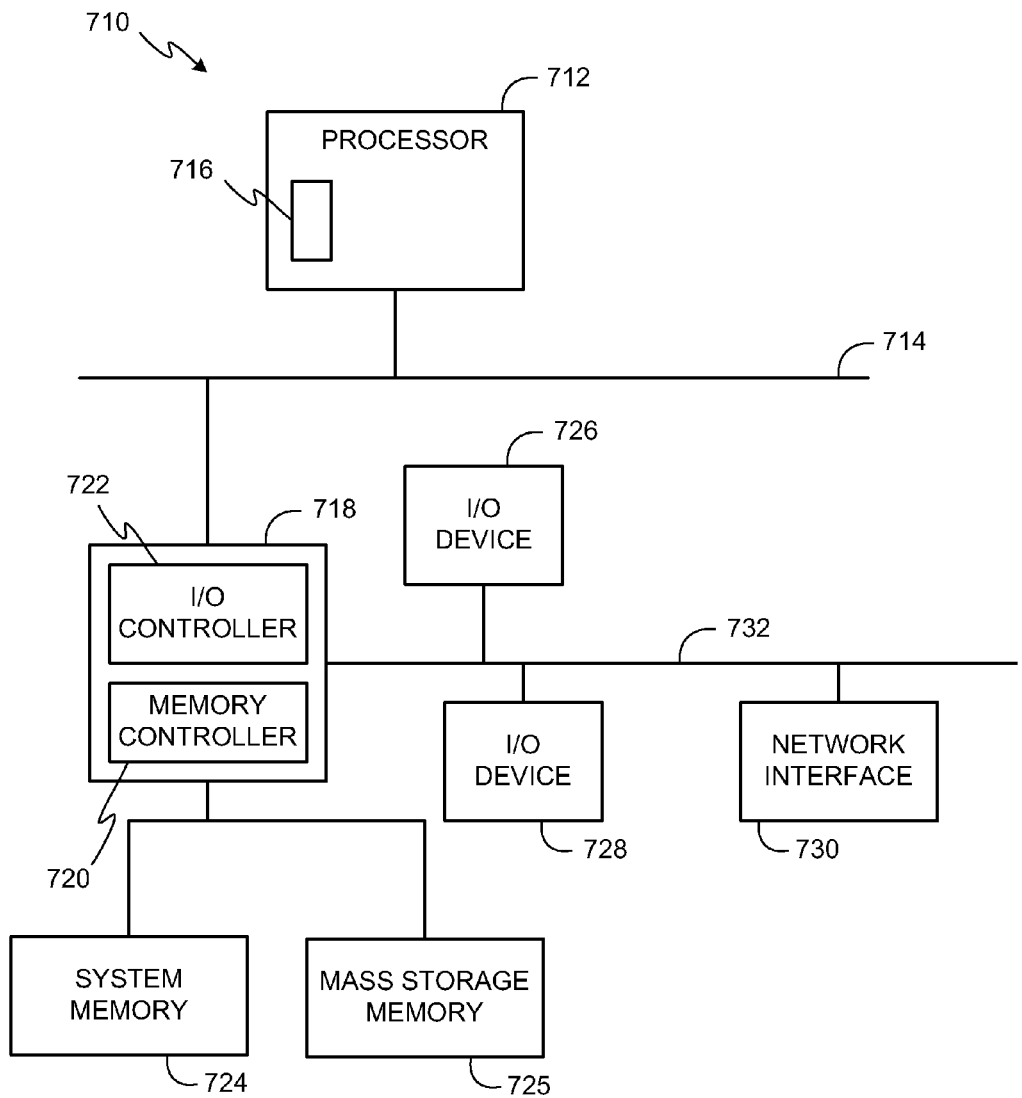
FIG. 7 is a block diagram of an example processor system that may be used to implement the methods and apparatus described herein.

FIG. 7 is a block diagram of an example processor system 710 that may be used to implement the apparatus and methods described herein. As shown in FIG. 7, the processor system 710 includes a processor 712 that is coupled to an interconnection bus 714. The processor 712 includes a register set or register space 716, which is depicted in FIG. 7 as being entirely on-chip, but which could alternatively be located entirely or partially off-chip and directly coupled to the processor 712 via dedicated electrical connections and/or via the interconnection bus 714. The processor 712 may be any suitable processor, processing unit or microprocessor. Although not shown in FIG. 7, the system 710 may be a multi-processor system and, thus, may include one or more additional processors that are identical or similar to the processor 712 and that are communicatively coupled to the interconnection bus 714.

The processor 712 of FIG. 7 is coupled to a chipset 718, which includes a memory controller 720 and a peripheral input/output (I/O) controller 722. As is well known, a chipset typically provides I/O and memory management functions as well as a plurality of general purpose and/or special purpose registers, timers, etc. that are accessible or used by one or more processors coupled to the chipset 718. The memory controller 720 performs functions that enable the processor 712 (or processors if there are multiple processors) to access a system memory 724 and a mass storage memory 725.

The system memory 724 may include any desired type of volatile and/or non-volatile memory such as, for example, static random access memory (SRAM), dynamic random access memory (DRAM), flash memory, read-only memory (ROM), etc. The mass storage memory 725 may include any desired type of mass storage device including hard disk drives, optical drives, tape storage devices, etc.

The peripheral I/O controller 722 performs functions that enable the processor 712 to communicate with peripheral input/output (I/O) devices 726 and 728 and a network interface 730 via a peripheral I/O bus 732. The I/O devices 726 and 728 may be any desired type of I/O device such as, for example, a keyboard, a video display or monitor, a mouse, etc. The network interface 730 may be, for example, an Ethernet device, an asynchronous transfer mode (ATM) device, an 802.11 device, a DSL modem, a cable modem, a cellular modem, etc. that enables the processor system 710 to communicate with another processor system.

While the memory controller 720 and the I/O controller 722 are depicted in FIG. 7 as separate functional blocks within the chipset 718, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to execute an auxiliary recipe and a batch recipe in a process control system, the method comprising:
during execution of a process step of the batch, without pausing the execution of the batch, receiving first user input to queue an auxiliary recipe for execution;
when an entry point for the auxiliary recipe was not determined prior to starting the execution of the batch, receiving second user input during the execution of the batch to define the entry point for the auxiliary recipe;
determining whether the batch has reached the entry point at which the auxiliary recipe can be executed, the entry point being subsequent to the process step;
in response to determining that the batch has reached the entry point, pausing the execution of the batch and executing the auxiliary recipe; and
continuing the execution of the batch at the entry point after execution of the auxiliary recipe.

2. A method as defined in claim 1, further comprising executing the auxiliary recipe using process control equipment reserved for the batch.

3. A method as defined in claim 1, wherein the entry point is a transition point between at least two process steps of the batch.

4. A method as defined in claim 1, further comprising re-activating the batch after completion of execution of the auxiliary recipe.

5. A method as defined in claim 1, wherein the batch is associated with a first recipe identifier, and wherein the auxiliary recipe is associated with a second recipe identifier equal to the first recipe identifier.

6. A method as defined in claim 5, further comprising reserving equipment for the batch based on the first recipe identifier and facilitating the auxiliary recipe to use the equipment based on the second recipe identifier being equal to the first recipe identifier.

7. A method as defined in claim 1, further comprising generating the entry point by identifying a transition point between at least two process steps of the batch and determining that executing the auxiliary recipe at the transition point does not violate a process flow rule.

8. A method as defined in claim 1, further comprising determining whether the entry point for the auxiliary recipe was determined prior to starting the execution of the batch.

9. A method as defined in claim 1, wherein the auxiliary recipe is queued without modifying the batch.

10. An apparatus to execute an auxiliary recipe and a batch recipe in a process control system, the apparatus comprising:
a recipe interface to obtain an auxiliary recipe in response to a first user input received during execution of a batch recipe without the batch recipe being paused, the first user input to queue the auxiliary recipe for subsequent execution, the first user input to be received during execution of a process step of the batch recipe;

a user input interface to, when an entry point for the auxiliary recipe was not determined prior to starting the execution of the batch recipe, receive second user input during execution of the batch recipe to define the entry point for the auxiliary recipe;

a process status identifier to determine whether the batch recipe has reached the entry point at which the auxiliary recipe can be executed before completion of the batch recipe, the entry point occurring after the process step; and an operating mode selector to pause the execution of the batch recipe to cause execution of the auxiliary recipe in response to determining that the batch recipe has reached the entry point, and to continue the execution of the batch at the entry point after execution of the auxiliary recipe.

11. An apparatus as defined in claim 10, wherein the auxiliary recipe is separate from the batch recipe.

12. An apparatus as defined in claim 10, wherein the auxiliary recipe is executed using process control equipment reserved for the batch recipe.

13. An apparatus as defined in claim 10, wherein the entry point is a transition point between at least two process steps of the batch recipe.

14. An apparatus as defined in claim 10, wherein the operating mode selector is further to pause the execution of the batch recipe prior to executing the auxiliary recipe and to re-activate the batch recipe after the auxiliary recipe completes execution.

15. An apparatus as defined in claim 10, wherein the batch recipe is associated with a first recipe identifier, and wherein the auxiliary recipe is associated with a second recipe identifier equal to the first recipe identifier.

16. An apparatus as defined in claim 15 further comprising a resource manager to identify equipment reserved for the batch recipe based on the first recipe identifier and facilitate use of the equipment by the auxiliary recipe based on the second recipe identifier being equal to the first recipe identifier.

17. An apparatus as defined in claim 10, wherein the auxiliary recipe is to be queued without modifying the batch.

18. An apparatus as defined in claim 10, wherein the recipe interface is further to determine whether the entry point for the auxiliary recipe was determined prior to starting the execution of the batch.

19. A machine accessible storage disk or storage device having instructions stored thereon that, when execute, cause the machine to at least:

during execution of a process step of the batch, without pausing the execution of the batch, receiving first user input to queue an auxiliary recipe for execution;

when an entry point for the auxiliary recipe was not determined prior to starting the execution of the batch, receiving second user input during the execution of the batch to define the entry point for the auxiliary recipe;

determine whether the batch has reached the entry point at which the auxiliary recipe can be executed, the entry point being subsequent to the process step;

in response to determining that the batch has reached the entry point, pausing the execution of the batch and executing the auxiliary recipe; and continue the execution of the batch at the entry point after execution of the auxiliary recipe.

20. A machine accessible storage disk or storage device as defined in claim 19 having instructions stored thereon that, when executed, cause the machine to cause execution of the auxiliary recipe using process control equipment reserved for the batch.

21. A machine accessible storage disk or storage device as defined in claim 19, wherein the entry point is a transition point between at least two process steps of the batch.

22. A machine accessible storage disk or storage device as defined in claim 19 having instructions stored thereon that, when executed, cause the machine to re-activate the batch after completion of execution of the auxiliary recipe.

23. A machine accessible storage disk or storage device as defined in claim 19, wherein the batch is associated with a first recipe identifier, and wherein the auxiliary recipe is associated with a second recipe identifier equal to the first recipe identifier.

24. A machine accessible storage disk or storage device as defined in claim 23 having instructions stored thereon that, when executed, cause the machine to reserve equipment for the batch based on the first recipe identifier and facilitate the auxiliary recipe to use the equipment based on the second recipe identifier being equal to the first recipe identifier.

25. A machine accessible storage disk or storage device as defined in claim 19 having instructions stored thereon that, when executed, cause the machine to generate the entry point by identifying a transition point between at least two process steps of the batch and determine that executing the auxiliary recipe at the transition point does not violate a process flow rule.

26. A machine accessible storage disk or storage device as defined in claim 19, wherein the instructions are further to cause the machine to, before completion of the execution of the batch, determine whether the entry point for the auxiliary recipe was determined prior to starting the execution of the batch.

27. A machine accessible storage disk or storage device as defined in claim 19, wherein the auxiliary recipe is to be queued without modifying the batch.

28. A method to configure an auxiliary recipe for execution during a batch in a process control system, the method comprising:

identifying a transition point during execution of a batch between first and second process steps in the batch;

determining whether a recipe can be executed at the transition point in response to receiving user input when the first process step is running;

without pausing the execution of the batch, queuing the recipe for execution based on the user input; and storing a recipe entry point in association with the recipe in response to determining that the recipe can be executed at the transition point, wherein the recipe entry point corresponds to the transition point, and the recipe entry point to facilitate executing the recipe after pausing the batch and to facilitate continuing the execution of the batch at the entry point after execution of the recipe.

29. A method as defined in claim 28, wherein determining whether the recipe can be executed at the transition point comprises determining that executing the recipe at the transition point does not violate a process flow rule.

30. A method as defined in claim 28, wherein determining whether the recipe can be executed at the transition point comprises determining that executing the recipe at the transition point does not conflict with execution of the batch.

31. A method as defined in claim 28, further comprising generating an error message in response to determining that the recipe cannot be executed at the transition point.

32. A method as defined in claim 28, wherein the recipe entry point is to occur after completion of the first process step and before a start of the second process step, and the second process step configured to be executed immediately after the first process step.

33. An apparatus to configure an auxiliary recipe for execution during a batch in a process control system, the apparatus comprising:
    a recipe analyzer to receive a batch and to receive a recipe;
    a phase transition identifier to identify a transition point during execution of the batch between first and second process steps in the batch;
    a rules compliance verifier to determine whether the recipe can be executed at the transition point in response to receiving user input when the first process step is running, the user input to, without pausing the execution of the batch, queue the recipe for execution; and
    an entry point generator to store a recipe entry point, via a processor, in association with the recipe in response to determining that the recipe can be executed at the transition point, the recipe entry point to facilitate pausing the batch to execute the recipe and to facilitate continuing the execution of the batch at the entry point after execution of the recipe.

34. An apparatus as defined in claim 33, wherein the rules compliance verifier is to determine whether the recipe can be executed at the transition point by determining that executing the recipe at the transition point does not violate a process flow rule.

35. An apparatus as defined in claim 33, wherein the rules compliance verifier is to determine whether the recipe can be executed at the transition point by determining that executing the recipe at the transition point does not conflict with execution of the batch.

36. An apparatus as defined in claim 33, wherein the recipe entry point facilitates executing the recipe at the entry point after execution of the batch has started.

37. An apparatus as defined in claim 33, wherein the recipe analyzer is to generate an error message in response to the rules compliance verifier determining that the recipe cannot be executed at the transition point.

38. An apparatus as defined in claim 33, wherein the recipe entry point is to occur after completion of the first process step and before a start of the second process step, and the second process step configured to be executed immediately after the first process step.

* * * * *